Dec. 5, 1950 H. B. SPIEGEL 2,532,377

PHONOGRAPH PICKUP APPARATUS HAVING
A REMOVABLE CARTRIDGE

Filed Aug. 4, 1948 2 Sheets-Sheet 1

INVENTOR.
HERMAN B. SPIEGEL
BY
Brown, Denk & Synnestvedt
AGENTS

INVENTOR.
HERMAN B. SPIEGEL
BY
Brown, Denk & Synnestvedt
AGENTS

Patented Dec. 5, 1950

2,532,377

UNITED STATES PATENT OFFICE 2,532,377

PHONOGRAPH PICKUP APPARATUS HAVING A REMOVABLE CARTRIDGE

Herman B. Spiegel, Philadelphia, Pa., assignor to Philco Corporation, Philadelphia, Pa., a corporation of Pennsylvania Application August 4, 1948, Serial No. 42,381

4 Claims. (Cl. 179—100.41)

The present invention relates to phonograph apparatus and, particularly, to devices operable to reproduce sound from phonograph records. More specifically, the invention has to do with the provision of improved means for establishing electrical connection between the transducer or pickup device and the audio amplifier of a phonograph apparatus.

Recent developments in phonograph record players have made it possible to provide an improved crystal pickup which is characterized by its light weight and its adaptability to operate, with high fidelity, at extremely low needle-pressure. A pickup of this improved type is disclosed and claimed in the copending application of Cleon D. O'Neal, Serial No. 59,168, filed November 9, 1948, which application is assigned to Philco Corporation. The improved pickup, generally, takes the form of a unitary cartridge which is adapted for slidable and removable engagement with a supporting structure provided within the head of the tone-arm.

In using a pickup cartridge of the character above mentioned, it was found that variations from the adjusted position of the tone-arm perpendicularly to the record surface, unduly vary the needle-pressure. These variations in needle-pressure deleteriously affect the tracking engagement of the needle point with the groove of the record, and result in faulty and distorted reproduction. In order to overcome these disadvantages, an improved supporting structure for the pickup cartridge has been devised, and is described and claimed in a copending application of Richard S. Cranmer, Serial No. 42,525, filed August 4, 1948, which application is also assigned to Philco Corporation. Broadly, the improved supporting structure is such that it not only retains the pickup cartridge to insure proper tracking, but it also functions to allow the pickup to follow the imperfectly flat playing surface of the record, without unduly disturbing the adjusted level of the tone-arm. For that purpose, a member which is adapted to receive the pickup cartridge and to maintain it in proper position, is pivotally mounted on the tone-arm so as to rock freely in a plane transverse to the playing surface of the record, thereby allowing pivotal movement of the pickup cartridge in relation to the tone-arm.

The association of a slidably removable pickup cartridge with a pivotally mounted holding member has given rise to certain difficulties in providing a suitable electrical connection for the pickup cartridge, and it is the primary object of this invention to overcome these difficulties. To that end, the pickup cartridge and its pivotal supporting structure are provided with mutually related contact members which cooperate in a novel manner to insure positive electrical connection when the pickup cartridge is placed in operative position in the supporting structure.

It is also an object of the invention to provide a simple yet effective arrangement whereby proper electrical connection for the removable pickup cartridge, may be readily made upon placement of said cartridge in engagement with the pivotal support. For that purpose, depressible spring contacts are arranged on the pivotal support, and fixed rigid contacts are disposed on the pickup cartridge for sweeping engagement with said spring contacts as the pickup cartridge is being introduced into its support.

Another and more specific object of the invention resides in the provision of means which, in addition to establishing proper electrical connection between the pickup cartridge and the audio amplifier, further assists in the adequate retention of said cartridge in its support. In accordance with this object of the invention, resilient contact terminals are associated with rigid contact terminals in such a manner as to urge the pickup cartridge into constant snug engagement with its support.

These and other objects, and the manner in which they are attained, will be fully understood from the following description based on the accompanying drawings which illustrate a preferred embodiment of the invention. In these drawings, Figure 1 is a sectional-elevational view, on a greatly enlarged scale, of the head portion of a tone-arm in which the features of the invention are incorporated;

Figure 1:
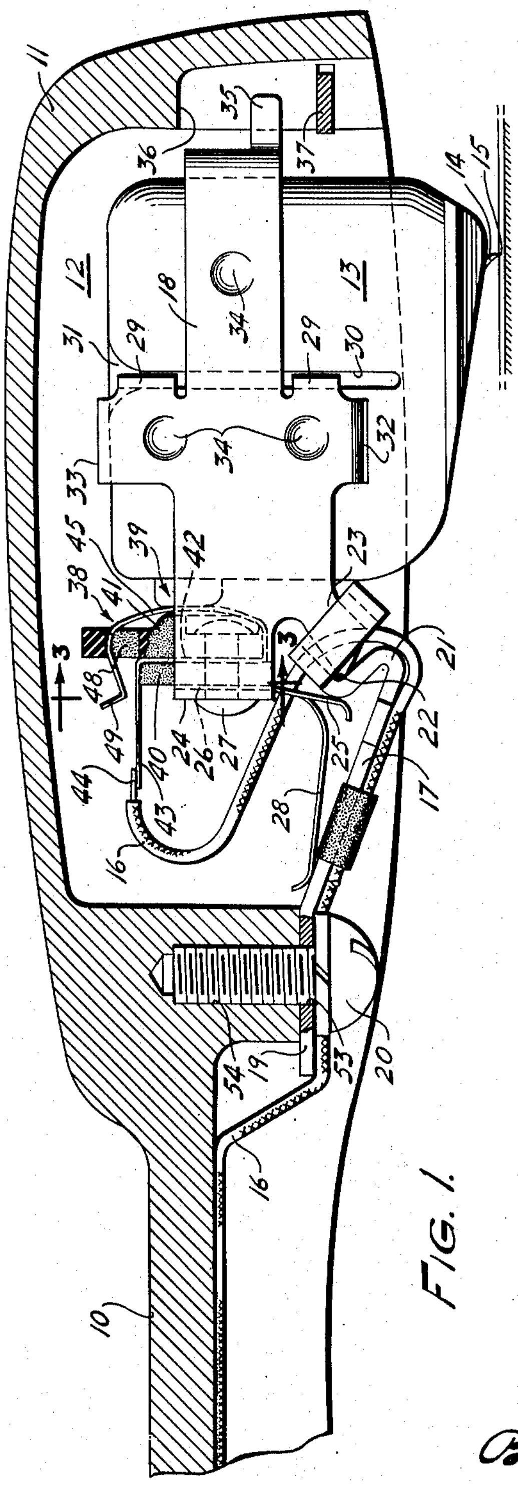
Figure 2:
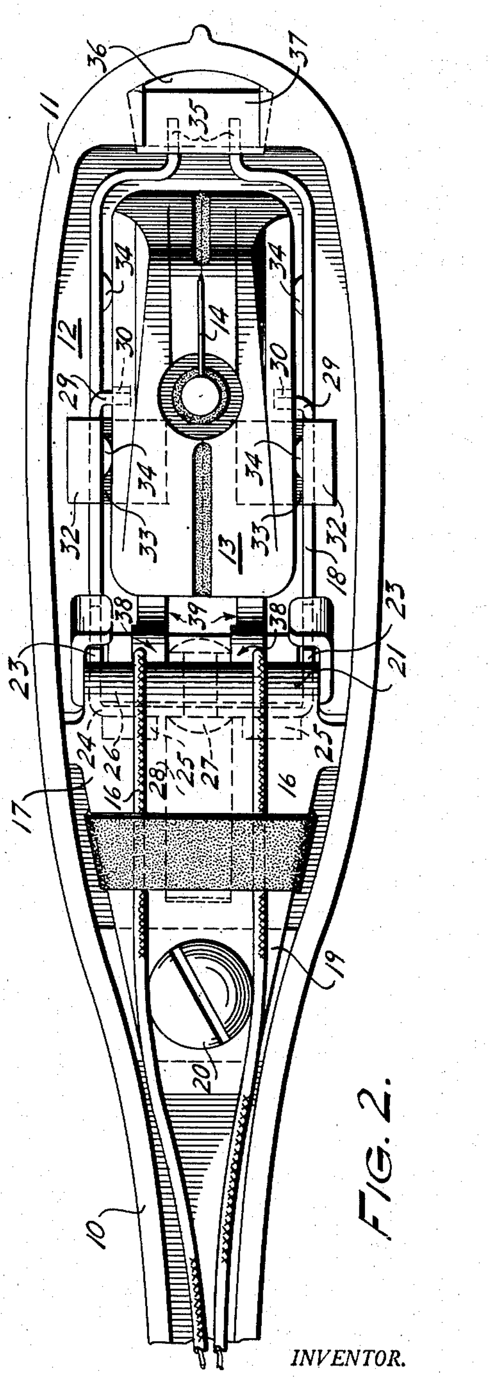
Figure 2 is a bottom plan view of the arrangement shown in Figure 1.
Figure 3:
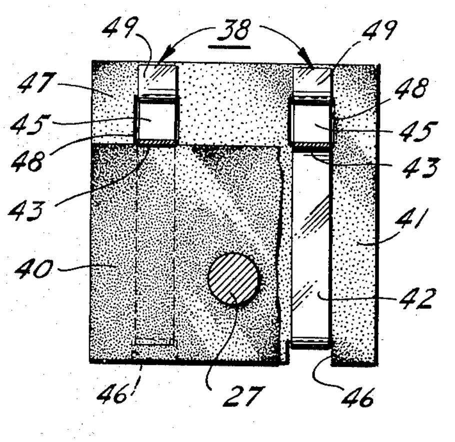
Figure 3 is a fragmentary view, on a larger scale, looking in the general direction of arrows 3—3 of Figure 1.

Referring more particularly to Figures 1 and 2 of the drawings, the tone-arm 10, as shown, includes a hollowed head portion 11 which provides a recess 12. This recess opens at the underside of the tone-arm head, and is adapted to house the supporting structure for a pickup cartridge 13. As above indicated, the construction of the pickup cartridge constitutes the subject matter of the aforesaid copending application of Cleon D. O'Neal, and forms no part of the present invention except insofar as it relates to the means which provides for its electrical connection. It is sufficient to state here that the pickup cartridge encloses a piezoelectric crystal unit which is driven by reason of its association with a needle 14, the point of which is disposed for engagement with the modulated groove of a record, as represented at 15 in Figure 1. Driving of the piezoelectric crystal unit generates electrical signals which are transmitted, through leads 16, to the audio amplifier of a conventional radio apparatus (not shown) for converting said signals into audible sounds. It is significant to note that the pickup cartridge is especially devised to be of light weight and to track at low needle-pressure. In practice, the completely assembled cartridge weighs approximately 3½ grams, and is adapted to track at a needle-pressure of the order of 5 grams.

Because of this exceedingly light weight and low tracking needle-pressure, it is important that the supporting structure for the pickup be such that it can readily accommodate itself to the inherent irregularities in the playing surface of the record and, therefore, it will be appreciated that the manner of supporting the pickup in the tone-arm, as well as the manner of mounting the tone-arm itself, becomes critical.

The means for mounting of the tone-arm to insure the desired low needle-pressure, and the means providing for the unobstructed tracking motion of the supported pickup are not shown, but suitable means for these purposes are disclosed and claimed in the copending applications of Hermann Lingenbrink, Serial No. 45,062, filed August 19, 1948, and of Louis C. Ammlung, Jr., Serial No. 48,426, filed September 9, 1948, which applications are assigned to Philco Corporation.

The manner of supporting and the structure employed to support the pickup are set forth in detail in the aforesaid copending application of Richard S. Cranmer. Basically, this pickup supporting structure, as is shown in Figures 1 and 2 of the accompanying drawings, comprises a support 17 and a U-shaped clamping member 18 for the pickup cartridge. One end 19 of support 17 is conveniently affixed to the tone-arm, for instance by means of a suitable fastening element 20. The other or free end portion 21 of the support provides seats 22, one of which is clearly seen in Figure 1. Angularly extending pointed lugs 23 depend from clamping member 18 adjacent the closed end 24 thereof. These pointed lugs are adapted to sit in seats 22 and, thus, provide pivotal points about which the cartridge clamping member may rock bodily. Proper seating of the lugs 23 in their seats 22, is obtained by means of relatively spaced spring fingers, one of which is clearly shown at 25 in Figure 1. These fingers are provided on a spring metal plate 26 which is mounted on the closed end 24 of clamping member 18, for instance, by means of a rivet 27. The spring fingers are disposed to cooperate with pointed lugs 23 to form clips which engage opposite faces of seat-forming portions of support 17.

Yieldable movement of the cartridge clamping member 18 about its pivotal points, is obtained by means of a third or intermediate spring finger 28 which is provided on the spring metal plate 26 and extended for engagement with support 17. Thus, spring finger 28 acts to maintain the needle point in tracking engagement with the record groove and at substantially constant needle-pressure, but permits said member and cartridge to oscillate up and down in accordance with variations in the playing surface, without changing the operative level of the tone-arm. The yieldability of the cartridge mounting has the additional advantage of protecting the needle 14 and its point from injury should the tone-arm be accidentally dropped on the record because, when the arm is so dropped, the cartridge retracts into the tone-arm head, thereby relieving the needle and its point from the shock.

As previously pointed out, the pickup cartridge is adapted to slide into and out of engagement with its clamping member 18. For that purpose, each of the opposite side arms of said member is provided with inwardly projecting guide tongues 29, which, as shown in Figures 1 and 2, are disposed to engage a groove 30 provided on each of the opposite faces of the cartridge. The tongues 29 and grooves 30 also cooperate to prevent undue rotational movement of the cartridge in relation to the clamping member. Each groove is provided with outwardly flared portions 31 (Figure 1) to facilitate engagement of the grooves with the guide tongues, and the clamping member is provided with depending flared extensions 32 to facilitate introduction of the cartridge into engagement with said member. Correct elevation of the cartridge in the clamping member is determined by means of abutments 33 extending from the upper edges of said member to engage the upper marginal end portion of the cartridge. Inwardly depressed dimples 34 which are arranged on the arms of clamping member 18 to provide point contacts between the cartridge and its clamping member, increase the frictional clamping action on the cartridge and insure its proper alignment between said arms. Rigid fingers 35, which project from the arms of the clamping member, cooperate with an abutment 36 to arrest upward movement of the clamping member against the push exerted by movement of the cartridge when being brought into engagement with said member, and with an abutment 37 to arrest downward movement of the clamping member against the pull exerted by movement of the cartridge when being removed from the clamping member.

In accordance with the present invention, improved means are provided to establish electrical connection between the leads 16 and the piezoelectric unit in cartridge 13, when said cartridge is brought in operative position in the clamping member 18. For that purpose, a pair of resilient contact terminals 38 are conveniently arranged on the clamping member, and a pair of rigid contact terminals 39 are suitably affixed to the cartridge and disposed thereon for cooperative engagement with said yieldable terminals.

The resilient terminals are mounted by means of insulating blocks 40 and 41 which are advantageously anchored, through rivet 27, to the closed end 24 (Figure 1) of the clamping member. Each of the resilient terminals consists of a strip of spring metal having the general configuration best seen in Figure 4. The terminal strips are adapted to be mounted in spaced parallel relationship and, for that purpose, each strip has a substantially straight intermediate portion 42 adapted to be clampingly retained in a general vertical position between the insulating blocks 40 and 41. Each strip also has a substantially straight end portion 43, which extends rearwardly from and at an angle to the upper extremity of the intermediate portion 42, and which passes over the top edge of insulating block 40. These straight rearwardly extending end portions are electrically connected, as represented at 44, to the leads 16. Each strip further has another end portion 45 which extends forwardly from the lower extremity of the intermediate portion 42, and which is bowed upwardly therefrom. These bowed end portions fit in recesses 46 which are spaced along the lower edge of insulating block 41 and serve to localize the strips. The upper part 47 of block 41 extends above the top edge of block 40 and is provided with spaced apertures 48 which are disposed in substantially vertical alignment with the recesses 46. These apertures receive the upper and rearwardly projecting extremities of the bowed portions 45, which portions terminate with angular extensions 49 disposed to cooperate with adjoining rearward surface portions of block extension 47. In this manner, the resilient terminals can be freely depressed rearwardly but are prevented from springing out of operative position when the pickup cartridge is removed from its support.

The rigid contact terminals 39 are mounted to project outwardly from the rearward marginal edge wall of the pickup cartridge. In accordance with the invention, the rigid contact terminals take the form of generally U-shaped metal elements, one of which can be clearly seen in Figure 4 of the drawings. These elements embrace portions of the outer and inner surfaces of the wall which provides the rearward marginal edge of the cartridge, so that a part 50 of each element lies outside the cartridge and another part 51 of each element is enclosed within the cartridge. These enclosed parts 51 of the rigid contact terminals are electrically connected, for instance, as shown at 52 in Figure 4, with the usual conductors of the crystal unit, which is also enclosed in the cartridge.

Figure 4:
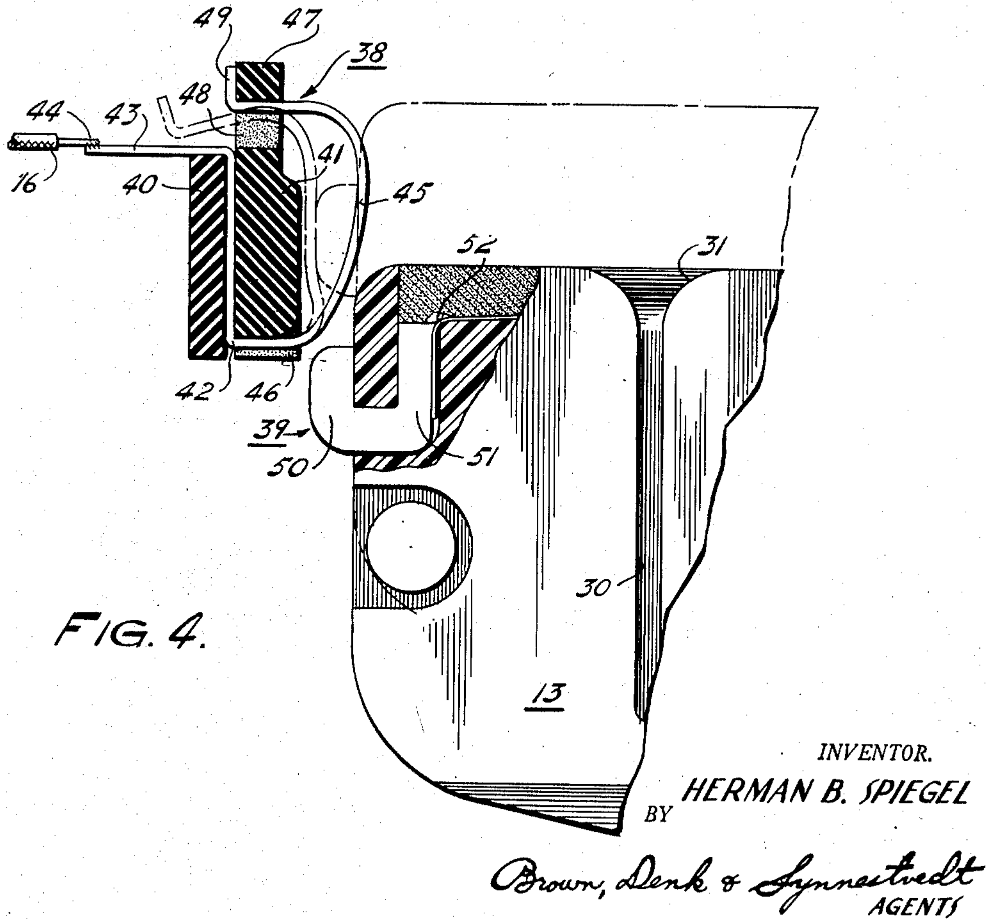
Figure 4 is a fragmentary sectional-elevational view, on a still larger scale, of certain parts of the arrangement illustrated in Figure 1, the pickup cartridge being shown in a position wherein the complementary contact terminals are out of mutual engagement.

In practice, the rigid contact terminals are relatively spaced to correspond with the relative spacing of the resilient contact terminals, when the cartridge is introduced in operative position within the clamping member. When so introduced, the cartridge is guided in such a manner, by the cooperative function of the tongues 29 and slots 30, that the rigid terminals sweep into engagement with and snugly press against the resilient terminals, as represented in Figure 4 of the drawings. The sweeping and pressing engagement of the rigid terminals with the resilient terminals deflects the latter and, due to the fact that the parts 50 of the rigid terminals provide elongated contacting surfaces, a good and positive electrical connection between the mated contact terminals is assured. Moreover, the deflection of resilient terminals 38 by the elongated rigid terminals 39, places said resilient terminals under increased tension which reacts against said rigid terminals and, thus, urges the cartridge in a direction to effect snug engagement between the adjoining sides of tongues 29 and grooves 30 on the clamping member and on the cartridge, respectively.

From the foregoing description, it will be understood that the invention makes is possible to provide a most practical and convenient contact arrangement to effect positive electrical connection for a removable pickup cartridge. Particularly, it will be appreciated that the arrangement is most advantageous for use with a light-weight pickup which is adapted to track at exceedingly low needle-pressure, because the interengagement of the spring contact terminals with the rigid contact terminals not only provides for good electrical connection, but also assists in stabilizing the cartridge in its clamping member. This stabilizing effect takes place because the spring terminals normally tend to effect firm interengagement between cooperating portions of the cartridge and its supporting structure.

It will be particularly appreciated that the relationship between the pickup holding member 18 and the support 17, makes it possible to assemble these parts as a unit which may then be readily mounted on the tone-arm. Such unit, in addition to member 18 and its support 17, would include terminals 38 with leads 16 connected thereto, the spring fingers 25 and 28 on plate 26, and the blocks 40 and 41 which cooperate with rivet 27 to secure said terminals and plate on said member. In mounting the unit on the tone-arm, member 18 is inserted in recess 12 by first introducing fingers 35 between abutments 36 and 37. The unit is then moved until aperture 53 (Figure 1) in end portion 19 of support 17 registers with threaded bore 54 in the tone-arm head portion, whereupon screw-threaded element 20 is engaged through said aperture and with said bore to secure and to lock the unit in operative position within the recess 12 of the tone-arm head.

I claim:

1. In a phonograph tone-arm, a hollowed head portion rigid with the tone-arm, a support fixed to the tone-arm and enclosed in said head portion, a pickup holding member also enclosed in said head portion and connected with said support for pivotal movement in relation thereto, said member being provided with a closed end portion and two spaced confronting side portions, a pickup cartridge received between said side portions of said member for movement therewith, said cartridge and said side portions of the holding member having interengaging tongues and grooves, resilient terminals on the closed end portion of said member, and rigid terminals disposed on the pickup cartridge and pressingly engaging said resilient terminals, said resilient terminals and said rigid terminals cooperating to urge the pickup cartridge in a direction to effect engagement between said tongues and grooves.

2. In a phonograph tone-arm, a hollowed head portion rigid with the tone-arm, a support enclosed in and fixedly connected to said head portion, a pickup holding member connected with said support for pivotal movement in relation thereto and provided with a closed end portion and two spaced confronting side portions, a pickup cartridge removably received between the side portions of said member, insulating blocks anchored to the closed end portion of said member, resilient terminals each consisting of a spring metal strip having a portion clamped between said blocks and further having a bowed portion extending from said clamped portion and projecting into the space between the side portions of said member, and rigid terminals provided on the pickup cartridge for cooperative association with said resilient terminals, each of said rigid terminals having an elongated portion disposed to sweep into pressing engagement with the bowed portion of the associated terminal strip, when the pickup cartridge is received in its holding member, one of said blocks having an extended portion provided with transverse openings, and the bowed portions of said strips terminating with angular extensions passing through said openings and cooperating with surface portions of said one block to limit movement of said bowed portions into the space between the side portions of the pickup holding member, when the pickup cartridge is removed from said member.

3. In a phonograph tone-arm, a hollowed head portion rigid with the tone-arm, a support enclosed in and fixedly connected to said head portion, a pickup holding member connected with said support for pivotal movement in relation thereto and provided with a closed end portion and two spaced confronting side portions each having inwardly directed tongues, a pickup cartridge removably received between the side portions of said member and having grooves in engagement with said tongues, resilient terminals mounted on the closed end portion of said member, each resilient terminal consisting of a spring metal strip having a bowed portion projecting into the space between the side portions of said member, and rigid terminals provided on the pickup cartridge for cooperative association with said resilient terminals, each of said rigid terminals having an elongated portion disposed to sweep into pressing engagement with the bowed portion of the associated terminal strip, when the pickup cartridge is received in its holding member, the pressure between said bowed portions and said elongated portions serving to establish positive contact therebetween and also serving to urge the pickup cartridge in a direction to effect engagement between adjacent surfaces of said tongues and grooves.

4. In a phonograph tone-arm, a hollowed head portion rigid with the tone-arm, a support enclosed in and fixedly connected to said head portion, a pickup holding member connected with said support for pivotal movement in relation thereto and provided with a closed end portion and two spaced confronting side portions each having inwardly directed tongues, a pickup cartridge removably received between the side portions of said member and having grooves in engagement with said tongues, insulating blocks anchored to the closed end portion of said member, one of said blocks having an extended portion provided with transverse openings, resilient terminals each consisting of a spring metal strip having a portion clamped between said blocks and further having a bowed portion extending from said clamped portion and projecting into the space between the side portions of said member, said bowed portions terminating with angular extensions passing through the openings in said one block and cooperating with surface portions of the latter to limit the movement of said bowed portions into the space between the side portions of said member, and rigid terminals provided on the pickup cartridge for cooperative association with said resilient terminals, each of said rigid terminals having an elongated portion disposed to sweep into pressing engagement with the bowed portion of the associated terminal strip, when the pickup cartridge is received in its holding member, the pressure between said bowed portions and said elongated portions serving to establish positive contact therebetween and also serving to urge the pickup cartridge in a direction to effect engagement between adjacent surfaces of said tongues and grooves.

HERMAN B. SPIEGEL.

REFERENCES CITED

The following references are of record in the file of this patent:

UNITED STATES PATENTS

| Number | Name | Date |
|---|---|---|
| 1,679,846 | Warner | Aug. 7, 1928 |
| 1,894,543 | Rowe | Jan. 17, 1933 |
| 2,320,427 | Guedon | June 1, 1943 |
| 2,331,122 | Jones | Oct. 5, 1943 |
| 2,351,948 | Gay | June 20, 1944 |
| 2,453,894 | Chorpening | Nov. 16, 1948 |
| 2,455,466 | Brubaker | Dec. 7, 1948 |
| 2,464,064 | Thompson | Mar. 8, 1949 |
| 2,489,378 | Kalmus | Nov. 29, 1949 |